(12) United States Patent
Endo et al.

(10) Patent No.: US 6,599,659 B1
(45) Date of Patent: Jul. 29, 2003

(54) SECONDARY CELL AND METHOD FOR PREPARATION THEREOF

(75) Inventors: Takahiro Endo, Kanagawa (JP); Koichiro Kezuka, Miyagi (JP); Tsuyonobu Hatazawa, Tokyo (JP)

(73) Assignee: Sony Corporation, Tokyo (JP)

( * ) Notice: Subject to any disclaimer, the term of this patent is extended or adjusted under 35 U.S.C. 154(b) by 154 days.

(21) Appl. No.: 09/932,049

(22) Filed: Aug. 17, 2001

(30) Foreign Application Priority Data

Aug. 18, 2000 (JP) ..................... P2000-248675

(51) Int. Cl.$^7$ ............................................. H01M 10/40
(52) U.S. Cl. ................... 429/127; 429/211; 429/245; 429/300; 429/306; 29/623.2
(58) Field of Search ................... 429/127, 209, 429/306, 300, 245, 211; 29/623.2

(56) References Cited

U.S. PATENT DOCUMENTS 4,761,353 A * 8/1988 Knodler et al.

FOREIGN PATENT DOCUMENTS

| JP | 2698145 | * | 1/1998 |
|----|---------|---|--------|
| JP | 2570162 | * | 2/1998 |

* cited by examiner

Primary Examiner—John S. Maples
(74) Attorney, Agent, or Firm—Sonnenschein, Nath & Rosenthal

(57) ABSTRACT

A secondary cell exhibiting superior flexibility and cell characteristics. This secondary cell has an anode, a polymer electrolyte layer and an anode, layered together. At least one of the anode and the anode is formed by a sheet-like electrode comprised of a current collector, composed mainly of carbon fibers, and an electrode mixture carried thereon. A metal foil is provided in sliding contact with the sheet electrode on the opposite side of the sheet electrode with respect to the polymer electrolyte layer, and an electrode terminal is taken from said metal foil. The cell device is sealed under a reduced pressure by an exterior member.

14 Claims, 3 Drawing Sheets

SECONDARY CELL AND METHOD FOR PREPARATION THEREOF

BACKGROUND OF THE INVENTION

1. Field of the Invention

This invention relates to a secondary cell and, more particularly, to a flexible secondary cell employing a polymer electrolyte.

2. Description of Related Art

Recently, in keeping up with the tendency towards reduction in size and weight of a portable electronic equipment, there is raised an increasing demand for reducing the size, thickness and the weight of a cell supplying the power to these electronic equipment, without dependency on whether the cell is to be used for driving or backup. In addition, there is raised a demand for the possibility of efficient utilization of the housing space in the equipment. For this sort of the power source, a lithium ion secondary cell, having a high energy density or output density, may be used highly conveniently.

In particular, a polymer electrolyte secondary cell, employing a polymer electrolyte, has a feature not achieved with conventional cells, that is the feature that it is superior in resistance against liquid leakage, while being thin and light in weight, so that the cell can be designed to match to the shape of the equipment in which to mount the cell. Moreover, the polymer electrolyte secondary cell has a feature that a laminate film having an aluminum foil core as an exterior material can be used and combined with a thin sheet-like electrode and with a polymer electrolyte to prepare a thin type cell. The secondary cell employing the polymer electrolyte is being researched in order to exploit the above features proper to the cell.

Meanwhile, the polymer electrolyte cell is of such a cell structure in which the two electrodes, namely a cathode and an anode, and an electrolyte layer, are in the form of solids not containing free liquids and in which the cathode and the anode are bonded and affixed together with the adherent polymer electrolyte in-between. So, even if the electrolyte layer is a highly flaccid visco-elastic material, the electrode itself is not elastic nor extendable, and hence is locally warped and destructed due to an external force such as that caused by warping, or the layer of the active material of the electrode is detached from the current collector to lower the cell characteristics appreciably.

So, there is disclosed in e.g., the Japanese Utility Model Publication 2570162 a thin type secondary cell in which particles of an active material is affixed via an electrically conductive material to the current collector. In this thin type secondary cell, the layer of the active material of the electrode may be prohibited from becoming detached from the current collector even if the electrode is slightly flexed under an external stress. Basically, since the thin type secondary cell is of a so-called bridge structure of the two pole collectors in which the layers of the active materials of the cathode and the anode and the electrolyte layers are unified and constrained, the cell element it self is difficult to undergo flexural deformation, such that, if it is tried to flex the cell device, the device itself is fractured and destroyed. In such case, it is possible to get a liquid electrode exhibiting high fluidity interposed between the cathode and the anode to improve the slip between the cathode and the anode and hence the flexibility of the cell device. However, since it is difficult to maintain uniform contact between the cathode and the anode via the electrolyte layer, the charging/discharging reaction suffers from non-uniformities to deteriorate the cell performance such as by precipitation of metal lithium.

In the Japanese Patent No.2698145, there is disclosed a thin type secondary cell employing a sheet electrode formed of an electrically conductive polymer polymerized in a space of a rubber-like porous sheet admixed with an electrification agent. Although the electrode itself is improved appreciably in flexibility, the layer of the active material of the electrode and the electrolyte layer are sandwiched between the current collectors of the cathode and the anode to lower the flexibility of the cell device. That is, if the flexible polymer is used as a material for the electrolyte and the electrodes, the polymer is constrained by the current collector or the exterior material having a low rate of deformation or elongation, so that a cell exhibiting superior flexibility has not as yet been produced.

SUMMARY OF THE INVENTION

It is therefore an object of the present invention to provide a secondary cell having superior flexibility and high cell characteristics.

In one aspect, the present invention provides a secondary cell having a cathode, a polymer electrolyte layer and an adnode, layered together, wherein at least one of the cathode and the anode is formed by a sheet-like electrode comprised of a current collector, composed mainly of carbon fibers, and an electrode mixture carried thereon, a metal foil is provided in sliding contact with the sheet electrode on the opposite side of the sheet electrode with respect to the polymer electrolyte layer, an electrode terminal being taken from the metal foil, and wherein the cell device is sealed under a reduced pressure by an exterior member.

With the present secondary cell, in which the sheet electrode and the metal foil are physically contacted with but are not secured to each other, sufficient lubriciousness may be maintained between the sheet electrode and the metal foil to provide a structure allowing for warping deformation and which is able to cope sufficiently with external stresses.

That is, even if an external stress is applied to the present cell, the sheet electrode may be slid relative to the metal foil to permit the cell to be subjected to warping deformation to assure sufficient flexibility of the cell.

The result is that the cell is improved appreciably in flexibility to eliminate local stress concentration or distortion ascribable to the warping deformation of the cell.

Thus, with the present cell, there is no risk of the cell itself becoming locally warped and destroyed, or of the layer of the active material of the electrode becoming detached from the current collector, thus suppressing the resulting deterioration of the cell performance.

Moreover, with the present cell, in which the terminal of the electrode, made up of a current collector, composed of carbon fibers, is derived from the metal foil, the electrode structure operates as a current interrupting valve in case of overcharging or short-circuiting.

That is, in case of abnormal cell operation, such as in overcharging or short-circuiting, a large quantity of gases, evolved with heating, are preferentially accumulated between the cathode and the metal foil to interfere with contact between the cathode and the metal foil.

Since this interrupts contact conduction between the electrode and the metal foil to prevent the current from flowing, it is possible to evade the risk of thermal runaway.

Thus, the present cell, in which the above-described electrode structure has the function of a current interrupting valve, is extremely high in safety in operation.

In another aspect, the present invention provides a method for the preparation of a secondary cell including sequentially layering a metal foil, from which an electrode terminal is derived, a first electrode, made up of a first current collector, composed mainly of carbon fibers, and an electrode mixture, carried by the first current collector, a polymer electrolyte layer, and a second electrode, made up of a second current collector, carrying a layer of an active material thereon, with the metal foil being in sliding contact with the first electrode, to form a cell device, and sealing the cell device under a reduced pressure with an exterior member.

With the above-described method for the preparation of the cell, in which the first electrode and the metal foil are not physically contacted with but are not secured to each other, the cell exhibits sufficient lubriciousness between the first electrode and the metal foil and hence can be warped and deformed, while it can subsequently cope with external stresses. That is, the present method for the preparation of the cell gives a cell exhibiting sufficient flexibility in that slipping may be allowed between the first electrode and the metal foil to permit warping and deformation of the cell. The result is that the cell manufactured by the present method is improved appreciably in flexibility, while there is no possibility of occurrence of local stress concentration or distortion due to warping or deformation of the cell.

Thus, the present method for the preparation of the cell gives cell which is free from the risk of local warping or destruction of the cell itself or of the layer of the active material of the electrode from being exfoliated from the current collector to suppress the resulting deterioration of the cell performance.

The present method for the preparation of the cell gives a cell, in which the metal foil has a sliding contact with the current collector of the electrode, and in which an electrode terminal is derived from the current collector of the electrode, the electrode structure operating as a current interrupting valve in case of overcharging or short-circuiting. That is, with the cell prepared by the present method, the large quantity of gases, evolved with heating, are preferentially accumulated between the cathode composed mainly of carbon fibers and the metal foil to interfere with direct contact between the cathode and the metal foil. This breaks the contact conduction between the electrode and the metal foil to prevent the current from flowing to evade the risk of thermal runaway.

So, the present method for the preparation of the cell gives cell, in which the electrode structure has the function as the current interrupting valve to assure high safety in operation.

DESCRIPTION OF THE PREFERRED EMBODIMENTS

Figure 1:
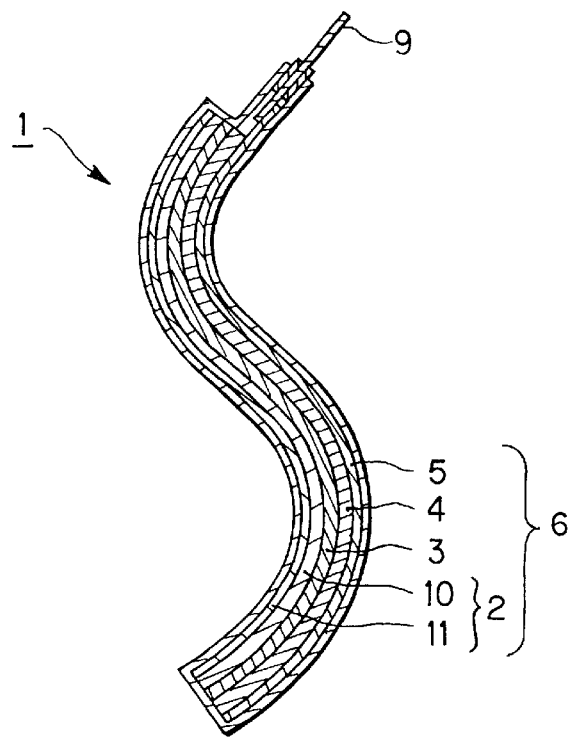
FIG. 1 is a longitudinal cross-sectional view showing an illustrative structure of a sheet-shaped lithium ion secondary cell embodying the present invention.

Referring to the drawings, preferred embodiments of the present invention will be explained in detail.

Figure 2:
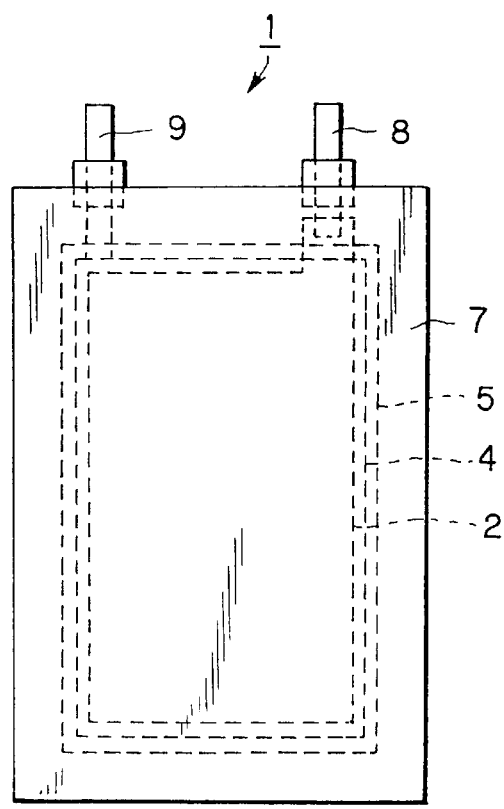
FIG. 2 is a plan view showing an illustrative structure of the sheet-shaped lithium ion secondary cell embodying the present invention.

FIGS. 1 and 2 illustrate a sheet-shaped lithium ion secondary cell embodying the present invention. The sheet-shaped lithium ion secondary cell 1 is comprised of a cell device 6, which is made up of a cathode 2, a polymer electrolyte layer 3, layered in abutting contact with the polymer electrolyte layer 3, and a metal foil 5 arranged in sliding contact with the anode 4. On the outer rim of the cathode 2 and on the outer rim 9 of the metal foil 5 are arranged a cathode terminal 8 and an anode terminal, respectively.

Depending on the type of the cell, desired to be produced, a layer of a cathode active material 10, containing a cathode active material, comprised of metal oxides, metal sulfides or specified high polymer materials, is deposited on a cathode current collector 11.

As the cathode current collector 11, aluminum, titanium or alloys thereof, for example, may preferably be employed. The cathode current collector 11 may take the from of a foil, lath, punching metal or a net. If a thin type cell is to be produced, the thickness of the cathode current collector 11 is preferably 20 $\mu$m or less.

The cathode active material, contained in the cathode active material 10, differs with the type of the cell to be prepared, such that there is no particular limitation to the cathode active material. For example, if a lithium ion cell or a lithium ion cell is to be prepared, there is no particular limitation to the cathode active material provided that the material is capable of occluding and expelling lithium. Specifically, composite lithium oxides, such as lithium-free metal sulfides or oxides, e.g., $TiS_2$, $MoS_2$, $NbSe_2$ or $V_2O_5$, or composite lithium oxides, represented by the general formula $LixMO_2$, where M is one or more transition metals and X is a numerical figure differing with the charging/discharging state of the cell and which usually is in a range of $0.05 \leq X \leq 1.10$, may be used. As the transition metal, Co, Ni or Mn is preferred. Specified examples of the composite lithium oxides include $LiCO_2$, $LiNiO_2$, $LiN_yCo_{1-y}O_2$, where $0<Y<1$, and $LiMn_2O_4$. These composite lithium oxides are capable of generating a high voltage and prove a cathode active material excellent in energy density. A plural number of the cathode active materials may be added in forming the above-described cathode active material.

In particular, lithium cobalt oxides or lithium nickel oxides are preferably used as the cathode active material in that these compounds give a high voltage and a high volumetric density and are superior in cyclic characteristics. These composite lithium oxides may be produced by pulverizing and mixing carbonates, nitrates, oxides and hydroxides with carbonates, nitrates, oxides or hydroxides of cobalt, manganese or nickel in desired proportions and sintering the resulting mixture in an oxidizing atmosphere in a temperature range of 600 to 1000° C.

In particular, these composite lithium oxides are able to generate a high voltage and prove a cathode active material having a superior volumetric density. As the cathode, plural sorts of the cathode active materials may be used in combination. In forming the above-described cathode active material, any known types of the electrification agents or binders may be added to the system.

Although there is no limitation to the polymer electrolyte forming a polymer electrolyte layer, a high molecular solid electrolyte exhibiting film separation characteristics and tackiness, or a gel electrolyte obtained on adding a plasticizer to this high molecular solid electrolyte, may preferably be used.

For example, in preparing the gel electrolyte, a non-aqueous electrolytic solution, such as esters, ethers or ester carbonates, may be used singly or as a component of the plasticizer.

As the electrolyte dissolved in this electrolytic solution, electrolytes used in an electrolytic solution in a routine cell, such as salts of light metals, e.g., lithium, sodium or aluminum, may be used depending on the type of the cell being produced or on the non-aqueous electrolytic solution being used. For example, in preparing the lithium secondary cell employing the non-aqueous electrolytic solution, $LiBF_4$, $LiClO_4$, $LiPF_6$, $LiAsF_6$, $LiCF_3SO_3$, $LiN(CF_3SO_2)_2$, $LiC_4F_9SO_3$, $LiCF_3CO_2$, $LiN(CF_3CO)_2$, $LiC_6F_5SO_3$, $LiC_8F_{17}SO_3$, $LiN(C_2F_5SO_2)_2$, $LiN(C_4F_9SO_2)(CF_3SO_2)$, $LiN(FSO_2C_6F_4)(CF_3SO_2)$, $LiN((CF_3)_2CHOSO_2)_2$, $LiC(CF_3SO_2)_3$, $LiB(C_6F_3(CF_3)_2\text{-}3,5)_4$, $LiCF_3$ or $LiAlCl_4$, may be used as electrolytes.

As the high molecular material, gelated by the above-mentioned electrolytic solution, silicon gel, acrylic gel, acrylonitrile gel, polyphosphasen modified polymer, polyethylene oxide, polypropylene oxide, composite polymers, cross-linked polymers or modified polymers thereof, may be used. Moreover, fluorine-based polymers, such as poly (vinylidene fluoride), poly(vinylidene fluoride-CO-hexafluoropropylene), (vinylidene fluoride-CO-tetrafluoropropylene), (vinylidene fluoride-CO-trifluoropropylene) and mixtures thereof, may be used, only by way of examples.

As for the gel electrolytes, if the solvent used is defined based e.g., on reactivity with a carbon anode, it is effective to use a chemically cross-linked monomer solution. If the electrolyte may be of lower film separating characteristics, separators formed of porous polyolefin or by a non-woven cloth is inserted as appropriate.

The anode 4 is comprised of an anode mixture containing an anode active material and the aforementioned polymer electrolyte carried on the anode current collector. The anode mixture is comprised of the anode active material and the binder dispersed in the organic solvent.

The anode active material used differs with the sort of the cell being produced, there being no limitations imposed on the anode active material to be in use. For example, if a lithium secondary cell is to be produced, it is possible to use a carbonaceous material, such as a carbonaceous material difficult to graphitize, or a graphite based material, capable of doping/undoping lithium, may be used as the anode active material. Specifically, an organic high molecular compound carbonized on firing cokes, pyrocarbons, pitch coke, needle coke or petroleum coke, graphites, vitreous carbons, phenolic resins or furane resins, at a suitable temperature, carbon fibers, or activated charcoal, may be used. As the other materials capable of doping/undoping lithium, high molecular materials, such as polyacetylene or polypyrrole, or oxides, such as $SnO_2$, may also be used. In forming an anode from these materials, any suitable known binders, such as polyvinylidene fluoride, may be used.

The organic solvents used may be of any suitable known solvents. Examples of the organic solvents used include ethylene carbonate, propylene carbonate, γ-butyrolactone, dimethyl carbonate, ethylmethyl carbonate and dipropyl carbonate.

According to the present invention, a current collector mainly composed of carbon fibers is preferably employed. By employing the current collector mainly composed of carbon fibers, as the anode current collector, the current collector itself is able to dope/undope lithium ions. In addition, the electrolyte may be prevented from becoming attached to the metal foil by adjusting the amount of impregnation of the polymer electrolyte to the anode. This prevents the metal foil, such as copper foil, from being eluated during over-discharging to eliminate consequent deterioration of the cell characteristics.

The metal foil 5 is arranged in sliding contact with the anode 4 and operates for aiding the anode in collecting the current. That is, the metal foil 5 is kept in electrical contact with the sheet-like anode 4, with the metal foil 5 being connected to the cathode terminal 9 such as by spot welding. With this structure, it is possible to take out the terminal in an electrically stable fashion from the current collector of the carbon fibers. As the metal foil 5, copper, nickel or alloys thereof may preferably be employed.

The exterior material 7 has the cell device 6 accommodated therein to interrupt intrusion of the moisture from the outside air to protect the cell, and is formed by, for example, a laminate film. The exterior material may be any suitable known material, such as, for example, aluminum laminate film (nylon/Al/polypropylene).

In the above-described sheet-shaped lithium ion secondary cell, a sheet-like current collector, mainly composed of carbon fibers, is used as an anode current collector. This anode current collector is impregnated with an anode active material, an anode mixture containing a binder, and a polymer electrolyte. The metal foil 5, operating for aiding in the current collecting action, is arranged in sliding contact with the anode. The anode 4 and the metal foil 5 are sealed under a reduced pressure at the time of sealing the cell with the exterior material, whereby the physical contact and the electrical contact are maintained only under the external pressure, that is atmospheric pressure.

Figure 3:
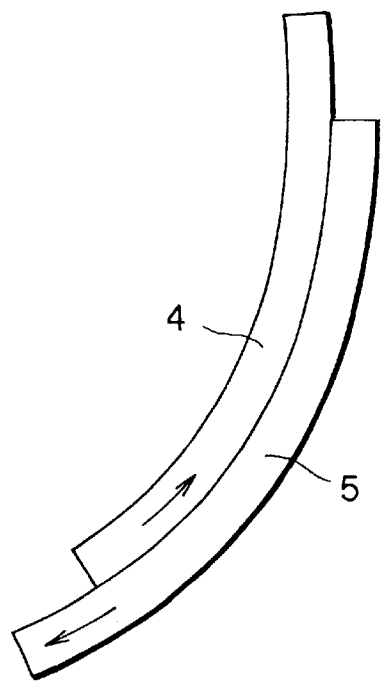
FIG. 3 shows a state in which slip is produced between the anode and a metal foil to cause shifting between the anode and a metal foil.
Figure 4:
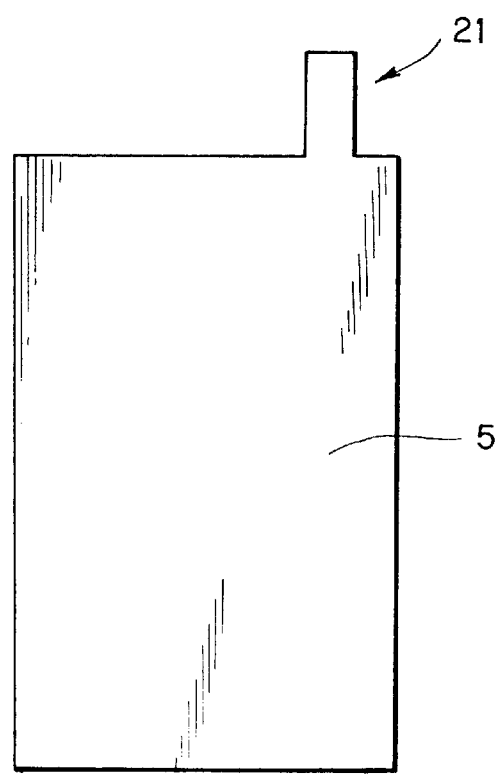
FIG. 4 shows the shape of a metal foil also operating as an anode electrode.

In this sheet-shaped lithium ion secondary cell, the anode 4 and the metal foil 5 are physically contacted with but not secured to each other, so that optimum lubriciousness is maintained between the anode 4 and the metal foil 5, to enable bending deformation such as to cope with an external stress satisfactorily. That is, in this sheet-shaped lithium ion secondary cell 1, the cell can be flexed and deformed, even if an external stress is applied to the cell, due to the slip between the anode 4 and the metal foil 5, as shown in FIG. 3, thus assuring optimum flexibility of the cell structure. That is, this sheet-shaped lithium ion secondary cell is improved significantly in flexibility of the cell structure to eliminate local stress concentration or distortion ascribable to the bending or deformation of the cell. So, with the present sheet-shaped lithium ion secondary cell, there is no risk of the electrode itself being locally bent or fractured or of the layer of the active material of the electrodes becoming detached from the current collector to suppress the resulting deterioration of the cell performance.

If the cell is to be a thin type cell, the thickness of the cell is preferably not larger than 1 mm. If the cell thickness is larger than 1 mm, there is produced difference in the peripheral length to lower the flexibility of the cell structure.

Moreover, with this sheet-shaped lithium ion secondary cell 1, in which the electrode-terminal of the anode 4 is taken from the metal foil 5, the anode structure operates as a current braking valve on the occasion of overcharging or short-circuiting of the cell. That is, in case of abnormal cell operation, such as in overcharging or short-circuiting, a large quantity of gases, evolved with heating, are preferentially accumulated between the anode 4 and the metal foil 5 to interfere with contact between the anode 4 and the metal foil 5. This interrupts contact or conduction between the anode 4 and the metal foil 5 to prevent the current from flowing, thus evading the danger such as thermal runaway. That is, the present sheet-shaped lithium ion secondary cell 1 is extremely high in safety in that the above-described anode structure has the function of the current breaking valve.

Moreover, the sheet-shaped lithium ion secondary cell 1 may be freed of the exterior member 7 provided on the anode 4. That is, in this sheet-shaped lithium ion secondary cell 1, the metal foil 5 is provided on the outer periphery of the anode 4. The metal foil 5 operates for assisting in the function of the anode 4 as the current collector, while possibly operating as an exterior member for interrupting and hermetically sealing the anode 4 from atmospheric air for assuring protection, so that it is possible to eliminate the exterior member otherwise provided on the anode.

By eliminating the exterior member on the anode 4, it is possible to reduce the thickness of the cell to assure a thinner cell thickness especially in a thin type sheet-shaped secondary cell. The result is that the merits of the cell employing a polymer electrolyte, such as a high molecular solid electrolyte or a gel electrolyte, namely the merits of the thin thickness and reduced weight, may be demonstrated to a maximum extent. In addition, the energy density may be improved by the exterior member becoming redundant.

In the above-described sheet-shaped lithium ion secondary cell 1, the metal foil may be used simultaneously as an anode terminal 9. For realizing this structure, it is sufficient if the shape of the metal foil 5 is set so as to be used simultaneously as the anode terminal 9. That is, a lug 21 of substantially the same size and shape as the anode terminal 9 may be formed in a portion of the metal foil 5 connected to the anode terminal 9 to perform the role of the anode terminal 9. This enables the cell structure and the cell manufacturing process to be simplified, as well as to eliminate a variety of defects, such as contact defects in the electrode terminal.

Although the current collector composed mainly of carbon fibers is used as the anode current collector, the current collector mainly composed of the carbon fibers may also be used, in which case the metal foil 5 arranged in sliding contact with the anode in the above-described embodiment is arranged in sliding contact with the cathode 2. This structure gives a meritorious effect similar to that described above. However, if lithium cobaltate, for example, is used as the cathode active material, the current collector mainly composed of carbon fibers is preferably used on the anode side, with the metal foil 5 being arranged in sliding contact with the anode 4, in view of the electron conductivity of the compound which is lower than that of the anode active material, such as graphite.

The sheet-shaped lithium ion secondary cell 1, constructed as described above, may be fabricated e.g., by the following method:

First, a layer of the cathode active material 10 is formed on one major surface of the cathode current collector to prepare the cathode 2. Specifically, a cathode mixture containing the cathode active material and a binder is evenly coated on one major surface of a metal foil, such as aluminum foil, operating as a cathode current collector, and dried in situ to form the layer of the cathode active material 10 on the major surface of the cathode current collector. The resulting product is compression-molded by a roll press to form a sheet-shaped cathode 2. As binder for the cathode mixture, any suitable known binder may be used. In addition, any suitable known additive may be used in the cathode mixture. The layer of the cathode active material 10 may be formed by cast coating or sintering, if so desired.

An anode 4 then is formed by having an anode mixture containing an anode active material carried on a sheet of carbon fibers operating as an anode collector. Specifically, the anode mixture, containing the anode active material and the binder, is evenly coated on one major surface of the sheet of the carbon fibers, operating as the anode current collector, and dried in situ. The resulting product is compression molded using a roll press. As the binder for the anode mixture, any suitable known binder may be used. The anode mixture may also be admixed with any suitable known additives.

There is no particular limitations to the sequence of fabricating the cathode 2 and the anode 4, such that a layer of the active material may be formed first and subsequently the current collector may be cut for use as an electrode, or the current collector may first be cut to the shape of an electrode and subsequently a layer of the active material may be formed thereon to form an electrode.

A polymer electrolyte layer 3 then is formed on the layer of the cathode active material 10 of the anode 4. For forming the gel electrolyte as the polymer electrolyte layer 3, an electrolyte salt is first dissolved in this plasticizer to prepare a plasticizer, which is then admixed with a matrix polymer and stirred vigorously to dissolve the matrix polymer to produce a sol-like electrolyte solution. This electrolytic solution is coated in a pre-set amount on one of the layers of the active material of the anode. The resulting system is allowed to cool at room temperature to gelate the matrix polymer to form the polymer electrolyte layer 3 formed of the gel electrolyte on the layer of the anode active material.

Meanwhile, the polymer electrolyte layer 3 may be formed by coating a pre-set amount of the electrolytic solution on a flat substrate, such as a glass plate, and allowed to cool at room temperature to a film or a sheet.

The cathode 2 and the anode 4 are layered together as the polymer electrolyte layer 3 formed on the cathode 2 is placed facing the anode 4 and thermally fitted together under pressure application. That is, the cathode 2 and the anode 4 are layered together and thermally fitted together under pressure application as the polymer electrolyte layer 3 is pinched between the cathode 2 and the anode 4. The cell device 6 may be completed on layering the metal foil 5 on the anode 4.

Figure 5:
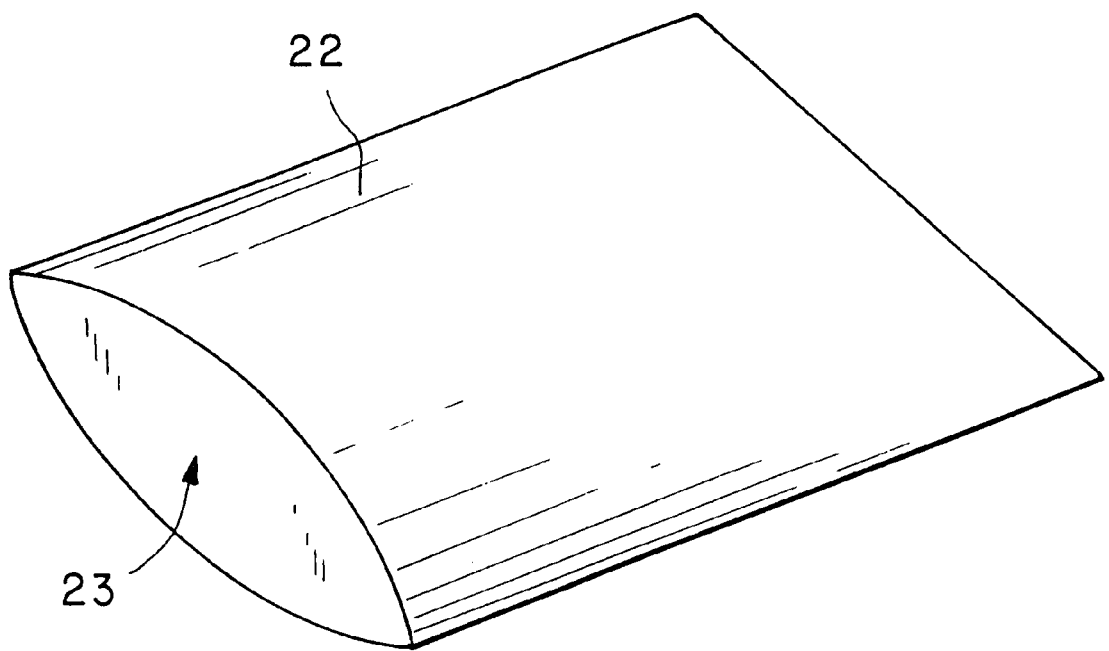
FIG. 5 shows an illustrative structure of an exterior bag.

The cell device 6, prepared as described above, is housed in an exterior bag 22 formed by an aluminum laminate film, as the exterior member 7, shown for example in FIG. 5. At this time, a cathode terminal 8 and an anode terminal 9 are arranged in position on the cathode 2 and the metal foil 5, respectively, so that one ends thereof will be protruded from an opening 23 of the exterior bag 22. For improving the sealing tightness of the opening 23, a high molecular material for thermal fusion is arranged around the cathode terminal 8 and the anode terminal 9.

As the inner pressure of the exterior bag 22 is decreased to a pre-set value, the outer rim of the exterior bag 22 is sealed by heat fusion. The inner pressure of the exterior bag 22 is desirably as low as possible if the pressure is below the atmospheric pressure and may for example be 10 Torr or less and more desirably 0.1 Torr or less. By sealing the cell under reduced pressure, with the inner pressure of the exterior bag 22 being in the range as described above, the cell can be sealed as optimum sliding contact state is maintained between the anode 4 and the metal foil 5.

The sheet-shaped lithium ion secondary cell 1, shown in FIGS. 1 and 2, may be prepared as described above.

In the above-described manufacturing method for the sheet-shaped lithium ion secondary cell, a current collector formed mainly of carbon fibers is used as a cathode current collector and the cell is sealed in the exterior bag 22 under reduced pressure as the cathode 4 and the metal foil 5 are layered together. By sealing the cell under reduced pressure, the cathode 4 and the metal foil 5 are maintained in the contacting state solely under the external pressure applied to the exterior bag 22, that is solely under the atmospheric pressure. So, a cell may be prepared in which the cathode 4 and the metal foil 5 are maintained in the sliding contact state, without being secured together, that is as optimum sliding properties are maintained between the cathode 4 and the metal foil 5. With the cell, prepared as described above, the cell itself is improved in flexibility without producing local stress concentration nor distortion caused by warping or deformation of the cell. Thus, with the present sheet-shaped lithium ion secondary cell, there is no risk of the cell itself being locally warped nor destroyed or of the layer of the active material of the cell becoming detached from the current collector to suppress the consequent deterioration in the cell performance.

So, with the above-described sheet-shaped lithium ion secondary cell, there is no risk of the cell itself being locally warped nor destroyed or of the layer of the active material of the cell becoming detached from the current collector, so that a secondary cell may be produced which may be immune from deterioration in the cell performance and which exhibits superior flexibility and optimum cell characteristics.

In the above-described method for preparing the sheet-shaped lithium ion secondary cell 1, a current collector composed mainly of carbon fibers is used as the anode current collector. Since the current collector composed mainly of carbon fibers uses carbon capable of doping/undoping lithium ions, it is possible to prevent the electrolyte from becoming attached to the metal foil 5 by adjusting the amount of impregnation of the polymer electrolyte into the cathode current collector. This allows to suppress deterioration of the cell performance ascribable to the eluation of, e.g., a copper foil during overcharging. Thus, with the above-described method for the preparation of the sheet-shaped lithium ion secondary cell 1, such a cell may be prepared in which deterioration of the cell performance due to overcharging may be suppressed and which is superior in cell characteristics.

Moreover, in the above-described manufacturing method for the sheet-shaped lithium ion secondary cell 1, in which the anode 4 has a sliding contact with the metal foil 5, and the electrode terminal of the anode 4 is derived from the metal foil 5, the anode structure may operate as a current interrupting valve during overcharging or short-circuiting of the cell. That is, in the abnormal cell operation, such as overcharging or short-circuiting, the large amount of the gas evolved with heating may preferentially be accumulated in a space between the anode 4 and the metal foil 5 to prevent contact between the anode 4 and the metal foil 5. Since this breaks the contact conduction between the anode 4 and the metal foil 5 to prevent the current from flowing, it is possible to evade the risk of, for example, thermal runaway. Specifically, with the above-described manufacturing method for the sheet-shaped lithium ion secondary cell, such a secondary cell may be prepared which is extremely high in safety with the anode structure having the function of the current interrupting valve.

Although the foregoing description is directed to a sheet-shaped lithium ion secondary cell, the present invention may be suitably modified within its purport without being limited to the illustrated embodiment. In particular, the present invention may be applied with advantage to a thin type secondary cell, which herein denotes a sheet-shaped secondary cell with a thickness not larger than 3 mm.

SPECIFIED EXAMPLES

For proving the meritorious effect of the present invention, the above-described sheet-shaped lithium ion secondary cell was prepared and its characteristics were evaluated.

Example

First, the anode 4 was prepared as follows:

90 parts by weight of graphite powders and 10 parts by weight of poly(vinylidene fluoride-CO-hexafluoropropylene) were mixed together to prepare an anode mixture, which was then dispersed in N-methyl-2-pyrrolidone to form a slurry. This slurry was evenly coated on one major surface of a sheet of carbon fibers, 100 µm in thickness, as an anode current collector, and dried in situ. The resulting product was compression-molded with a roll press to form the anode 4.

The cathode 2 then was prepared as follows:

For producing a cathode active material, lithium carbonate and cobalt carbonate were mixed at a molar ratio of 0.5 to 1 and sintered in air for five hours at a temperature of 900C.

90 parts by weight of the produced $LiCoO_2$, 6 parts by weight of graphite, as an electrification agent, and 4 parts by weight of poly(vinylidene fluoride-CO-hexafluoropropylene) were mixed together to prepare a cathode mixture, which then was dispersed in N-methyl-2-pyrrolidone to form a slurry. This slurry then was coated evenly on one major surface of a band-shaped aluminum foil, 20 µm in thickness, as the cathode current collector 11, and dried in situ. The resulting product was compression-molded in a roll press to form a sheet-like cathode.

The polymer electrolyte layer 3, as a gel-like polymer electrolyte layer, then was prepared as follows:

First, 42.5 parts by weight of ethylene carbonate (EC), 42.5 parts by weight of propylene carbonate (PC) and 15 parts by weight of $LiPF_6$ were mixed together to prepare a plasticizer. In 30 parts by weight of this plasticizer were mixed and dissolved 10 parts by weight of poly(vinylidene fluoride-CO-hexafluoropropylene) and 60 parts by weight of diethyl carbonate to prepare a polymer solution.

This polymer solution was evenly coated on the layer of the anode active material and on the layer of the cathode active material and allowed to stand at room temperature for eight hours to vaporize diethyl carbonate off to prepare a gel-like electrolyte layer.

The anode 4 and the cathode 2, carrying the gel-like electrolyte layers, were bonded together and thermally fitted together, with the respective gel-like electrolyte layers facing each other, and the cathode terminal 8 was welded by ultrasonic waves on the outer rim of the cathode current collector. A metal foil 5 of copper, 10 µm in thickness, was prepared and the anode terminal 9 was ultrasonically welded to the outer rim of the metal foil 5. This metal foil 5 was layered on the anode 4 to prepare the cell device 6.

This sheet-like cell device 6 was inserted into an exterior bag 22 of an aluminum laminate film, the outer rim of which was heat-sealed under reduced pressure of 0.1 Torr to prepare two sheet-shaped lithium ion secondary cells 1, each 140 mm in width, 196 mm in length and 0.5 mm in thickness.

Comparative Example 1

In this Comparative Example 1, two sheet-shaped lithium ion secondary cells 1 were prepared in the same way as in Example except preparing the anode 4 as now described and not employing the metal foil 5. Meanwhile, the lead of the anode 4 was directly taken out from the anode current collector.

First, 90 parts of graphite powders and 10 parts by weight of poly(vinylidene fluoride-CO-hexafluoropropylene) as a binder were mixed to prepare an anode mixture, which then was dispersed in N-methyl-2-pyrrolidone to form a slurry.

This slurry then was evenly coated on one major surface of a band-like copper foil, 15 μm in thickness, as an anode current collector, and dried in situ. The resulting product was compression-molded in a roll press to prepare the anode 4.

Comparative Example 2

In this Comparative Example 2, a sheet-shaped lithium ion secondary cell 1 was prepared in the same way as in Example except sealing the aluminum laminate film exterior bag under a reduced pressure of 100 Torr.

EVALUATION OF CHARACTERISTICS

The following test was conducted on the sheet-shaped lithium ion secondary cells 1 of the Example and Comparative Examples 1 and 2 to check for the energy density and upkeep ratio of the discharge rate as a function of the energy density and the progress of the charging/discharging cycles.

The test was conducted in a constant temperature chamber of 23° C. and comprised of a constant current low voltage charging of 1C rate and a constant current discharging of 0.5C rate in a range from 3.0 to 4.2V, as one cycle, and 200 cycles of the test were carried out in succession. The sheet-shaped lithium ion secondary cells were bent 90° ten times on end every cycle. Meanwhile, the cell capacity after one cycle was used as the initial capacity.

With the sheet-shaped lithium ion secondary cell 1 of the Example, the cell capacity was 1.15 Ah, the weight energy density was 148 Wh/kg and the vilumetroc emnergy density was 310 Wh/l after one cycle. The cell capacity after 200 cycles was 0.90 Ah, with the upkeep ratio being of a higher value of 78% of the initial capacity.

This may be presumed to be ascribable to the fact that, in the sheet-shaped lithium ion secondary cell 1 of the Example, the anode 4 and the metal foil 5 are physically contacting with each other but are not secured together, so that optimum sliding may occur therebetween to allow for warping or deformation and hence the external stress can sufficiently be coped with. That is, with the present sheet-shaped lithium ion secondary cell 1, since the metal foil 5, as an assistant current collector, is not constrained by the cell device 6, that is, the metal foil 5 is not fixed, the cell itself is appreciably improved in flexibility, while local stress concentration or distortion of the cell is not produced due to bending deformation of the cell. Thus, with the present sheet-shaped lithium ion secondary cell, there is no risk of local bending nor destruction of the electrode itself or of the layer of the active material of the electrode becoming detached from the current collector to suppress resultant deterioration in the cell performance.

Conversely, with the sheet-shaped lithium ion secondary cell 1 of the Comparative Example 1, the cell capacity after one cycle is 1.13 Ah, the weight energy density is 1.42 Wh/kg and the volumetric energy density is 305 Wh/l, indicating that the cell capacity achieved is comparable with that of the sheet-shaped lithium ion secondary cell 1 of the Example. However, the cell is bent due to bending deformation, thus producing creases in the laminate film as the exterior member 7. On the other hand, the cell capacity after two cycles is 0.21 Ah, with the upkeep ratio being only 19% of the initial capacity. Subsequently, charging/discharging was not feasible.

The reason is presumably that, since the sheet-shaped lithium ion secondary cell 1 of the Comparative Example 1 uses an anode current collector of the copper foil, and is of the conventional cell structure, the cell itself is low in flexibility and hence the local stress or distortion is produced due to warping or deformation of the cell, with the result that, with this sheet-shaped lithium ion secondary cell, the electrode itself is locally warped and destroyed due to warping deformation, or the layer of the active material of the electrode is detached from the current collector to produce deterioration of the cell performance.

On the other hand, with the sheet-shaped lithium ion secondary cell 1 of the Comparative Example 2, the cell capacity after one cycle is 0.41 Ah, the weight energy density is 53 Wh/kg and the volumetric energy density is 111 Wh/l, indicating that both the energy density and the cell capacity are only of low values. On the other hand, the cell capacity after two cycles is 0.10 Ah, with the upkeep ratio being only 24% of the initial capacity. Subsequently, charging/discharging was not feasible.

The energy density after one cycle and the cell capacity being of lower values may presumably be ascribable to the insufficient pressure decrease at the time of cell sealing and consequent insufficient electrical conduction between the anode 4 and the metal foil 5, with the cell resistance then being of an extremely high value.

It may be seen from above that, by application of the present invention, the sheet-shaped lithium ion secondary cell 1 may be produced in which the cell itself exhibits superior flexibility and is invulnerable to warping deformation due to external stress and in which the energy density or cyclic characteristics in the cell capacity is not deteriorated due to warping deformation of the cell.

Using cells different from those of the Example and the Comparative Example 1, used in the above test, an overcharging test was conducted as follows:

The overcharging test was conducted with the charging rate of 3 CmA, and an upper limit voltage of 18 V, with the charging being continued up to 250% of the cell capacity.

In this overcharging test, the sheet-shaped lithium ion secondary cell of the Example was seen to be slightly swollen in the exterior member 7, however, this swollen state of the exterior member 7 readily subsided, with the temperature reached of the cell being not higher than 40° C.

The reason may be such that the large amount of the gases evolved with heating caused by the overcharging was preferentially accumulated in a space between the anode 4 and the metal foil 5 to interrupt the contact conduction therebetween to prevent the current from flowing in the cell.

Conversely, with the sheet-shaped lithium ion secondary cell of the Comparative Example 1, the exterior member 7 was seen to undergo severe swelling, with the temperature reached of the cell being of a high value of 80° C.

The reason may be such that, with the sheet-shaped lithium ion secondary cell of the Comparative Example 1, in which the cell structure is similar to that of the conventional cell, the large amount of the gases evolved with heating caused by overcharging can find no way for escaping in the cell and is accumulated in the space between the anode 4 and the metal foil 5 to pressure the exterior member 7 to cause its severe swelling.

It may be seen from above that, according to the present invention, the electrode is automatically prohibited from conducting the current even on overcharging to prevent the risk such as thermal runaway to provide a sheet-shaped lithium ion secondary cell highly safe in operation.

In sum, the secondary cell according to the present invention has a cathode, a polymer electrolyte layer and an anode, layered together, wherein at least one of the anode and the anode is formed by a sheet-like electrode comprised of a current collector, composed mainly of carbon fibers, and an electrode mixture carried thereon. A metal foil is provided in sliding contact with the sheet electrode on the opposite side of the sheet electrode with respect to the polymer electrolyte layer, an electrode terminal being taken from the metal foil. The cell device is sealed under a reduced pressure by an exterior member.

Thus, the secondary cell according to the present invention is appreciably improved in flexibility and may be immune from local stress concentration or distortion due to warping and deformation of the cell. Consequently, with the secondary cell of the present invention, there is no risk of the secondary cell becoming locally warped and thereby destroyed or of the layer of the active material of the electrode becoming detached from the current collector to suppress the deterioration of the cell performance.

The method for the preparation of a secondary cell includes sequentially layering a metal foil, from which an electrode terminal is derived, a first electrode, made up of a first current collector, composed mainly of carbon fibers, and an electrode mixture, carried by the first current collector, a polymer electrolyte layer, and a second electrode, made up of a second current collector, carrying a layer of an active material thereon, with the metal foil being in sliding contact with the first electrode, to form a cell device, and sealing the cell device under a reduced pressure with an exterior member.

Thus, with the method for the preparation of a secondary cell according to the present invention, a secondary cell may be produced which is improved in flexibility and may be immune from local stress concentration or distortion due to warping and deformation. Consequently, with the method for the preparation of the secondary cell of the present invention, such a secondary cell may be produced in which there is no risk of the secondary cell becoming locally warped and thereby destroyed or of the layer of the active material of the electrode becoming detached from the current collector to suppress the deterioration of the cell performance.

Thus, the present invention provides a secondary cell which has satisfactory flexibility and superior cell characteristics.

What is claimed is:

1. A secondary cell having a cathode, a polymer electrolyte layer and an anode, layered together, wherein
at least one of the cathode and the anode is formed by a sheet-like electrode comprised of a current collector, composed mainly of carbon fibers, and an electrode mixture carried thereon;
a metal foil is provided in sliding contact with the sheet electrode on the opposite side of the sheet electrode with respect to the polymer electrolyte layer, an electrode terminal being taken from said metal foil; and
wherein
said cell device is sealed under a reduced pressure by an exterior member.

2. The secondary cell according to claim 1 wherein said cathode includes a layer of a cathode active material capable of doping/undoping lithium ions.

3. The secondary cell according to claim 1 wherein said polymer electrolyte layer is formed of a gel polymer electrolyte.

4. The secondary cell according to claim 1 wherein said exterior member is a laminate film.

5. The secondary cell according to claim 1 wherein said metal foil has an outwardly directing lug on an outer rim thereof.

6. The secondary cell according to claim 1 wherein the cell is a thin-type secondary cell.

7. A method for the preparation of a secondary cell comprising:
sequentially layering a metal foil, from which an electrode terminal is derived, a first electrode, made up of a first current collector, composed mainly of carbon fibers, and an electrode mixture, carried by the first current collector, a polymer electrolyte layer, and a second electrode, made up of a second current collector, carrying a layer of an active material thereon, with the metal foil being in sliding contact with the first electrode, to form a cell device; and
sealing the cell device under a reduced pressure with an exterior member.

8. The method for the preparation of a secondary cell according to claim 7 wherein said first and second electrodes are an anode and a cathode, respectively.

9. The method for the preparation of a secondary cell according to claim 8 wherein a layer of a cathode active material containing an active material capable of doping/undoping lithium ions is formed on said second current collector.

10. The method for the preparation of a secondary cell according to claim 7 wherein said first and second electrodes are a cathode and an anode, respectively.

11. The method for the preparation of a secondary cell according to claim 10 wherein a cathode mixture containing an active material capable of doping/undoping lithium ions is formed on said first current collector.

12. The method for the preparation of a secondary cell according to claim 7 wherein a gel polymer electrolyte is used as said polymer electrolyte layer.

13. The method for the preparation of a secondary cell according to claim 7 wherein a laminate film is used as said exterior member.

14. The method for the preparation of a secondary cell according to claim 7 wherein said metal foil is formed as an outwardly directing lug on an outer rim thereof.

* * * * *